United States Patent Office 3,529,003
Patented Sept. 15, 1970

3,529,003
FLUORINE CONTAINING SILICONES
Douglas A. Rausch and William C. Behnke, Midland, Mich., assignors to The Dow Chemical Company, Midland, Mich., a corporation of Delaware
No Drawing. Filed July 17, 1967, Ser. No. 653,615
Int. Cl. C07f 7/02
U.S. Cl. 260—448.2    5 Claims

ABSTRACT OF THE DISCLOSURE

The invention is novel fluorine containing silicones and a method of their preparation.

BACKGROUND OF THE INVENTION

This invention relates to novel fluorine containing silicones and to a method for their preparation. The compounds are water insoluble viscous oils suitable for use as lubricants, hydraulic fluids and dielectric fluids and may be converted into rubbery elastomeric solids.

SUMMARY

The present invention comprises novel fluorine containing silicones corresponding to the Formula I

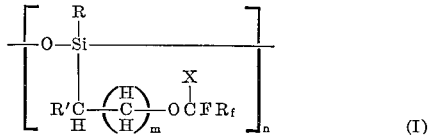

(I)

where R is an alkyl group, an aromatic group or an alkaryl group having from 1 to about 8 carbon atoms, $R_f$ is a saturated perfluoroaliphatic group having from 1 to about 8 carbon atoms, X is either F or $R_f$, $m$ is an integer ranging from 1 to 5 carbon atoms, R' is hydrogen or an aliphatic hydrocarbon group having from 1 to 4 carbon atoms, the silicone compound being further defined in that the maximum number of carbons in the group

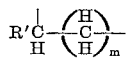

is 6, and $n$ is an integer greater than 1.

These compounds can be prepared by reacting a perfluoroalkoxide source material with an alkali metal fluoride to prepare the corresponding 1:1 addition product. This product in turn is reacted with an organic halide to provide the corresponding perfluoroalkyl haloalkyl ether which is dehydrohalogenated to yield the perfluoroalkyl alkenyl ether. Reaction of this product with an aliphatic, aromatic or alkaryl substituted halosilane or dialkoxysilane and subsequent hydrolysis of the resulting addition product yields the novel fluorine containing silicones of the present invention.

DESCRIPTION OF PREFERRED EMBODIMENTS

Preferred embodiments of the present invention are silicones corresponding to the Formula II

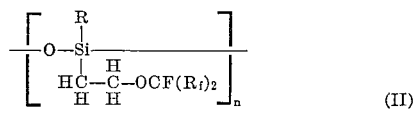

(II)

wherein $R_f$ is a saturated perfluoroaliphatic group containing from 1 to 3 carbon atoms, and R is an alkyl group containing from 1 to about 3 carbon atoms.

In accordance with the present invention, the novel silicone compounds ordinarily are prepared by reacting the perfluoroalkoxide source material, e.g. a perfluoroketone, with an alkali metal fluoride, particularly, for example potassium fluoride, cesium fluoride or rubidium fluoride in an inert aprotic organic polar solvent to produce the 1:1 addition product of the perfluoroalkoxide source material and alkali metal fluoride. The preparation of this addition product proceeds readily both at low temperatures and room temperature or higher. Conveniently, low temperatures, i.e. as in an ice bath, are employed to provide for ready control of the reaction.

A dihaloalkane having up to about 10 carbon atoms or haloalkyl aryl sulfonate ester, as organic halide reactant, is added to the reaction mass containing the 1:1 addition product and the resulting mixture maintained at from about 20 to about 150° C., usually heated at from about 60° to about 100° C. for a period of at least several hours, usually from about 12 to about 48 hours, to prepare the corresponding halo ether. This product is separated by treating the product mixture with an excess of water. Usually, after separating the oil product from the water it is dried and purified as by distillation.

Dehydrohalogenation to prepare the alkenyl ether is carried out in a conventional manner, i.e. as by contacting the perfluoroalkyl haloalkyl ether with a basic reagent in nonreactive solvent, e.g. alkali metal hydroxide in absolute ethanol or tributyl amine.

Reacting the resulting alkenyl ether with an alkyl, aromatic or alkaryl substituted dihalosilane or dialkoxysilane usually by contacting the reactants in the presence of a catalyst as conventionally employed for silane additions, e.g. $H_2PtCl_6$ or peroxides, and heating the reaction mixture in a sealed reactor at a temperature of from about 50 to 150° C., preferably at from about 100° to about 130° C. results in the addition of the silane to the alkenyl ether. Examples of operable silanes include, for example, dichlorophenylsilane, dichloromethylsilane, methyl bis-methoxysilane, dichloroethylsilane and the like. The selection for a given compound preparation will depend on the R group desired in the silicone product.

Hydrolysis of this product provides the novel fluorine containing silicone of the present invention.

Quantities of reactants to be employed can be about those stoichiometrically required for preparation of the desired reactant. Usually, in actual practice, however, an excess of either of the reactants is employed up to about 10 weight percent or more of that required stoichiometrically for a given product.

One preferred embodiment of the present invention is the silicone corresponding to Formula III

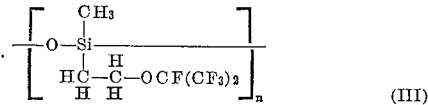

(III)

For illustrative purposes, one means of preparing this product is shown by the following series of reactions. For ease of understanding and following the process, only those reactants and products which actively take part and are of interest to the present preparation are shown in this sequential presentation.

(a) $CF_3\overset{O}{\overset{\|}{C}}CF_3$ + KF $\longrightarrow$ $(CF_3)_2CFO\text{-}K^+$
(hexafluoroacetone)

(b) $(CF_3)_2CFO\text{-}$ + $BrCH_2CH_2Br$ $\longrightarrow$ $(CF_3)_2CFOCH_2CH_2Br$
ethylene     heptafluoroisopropyl
dibromide    bromoethyl ether (c) $(CF_3)_2CFOCH_2CH_2Br$ $\xrightarrow[\text{KOH}]{\text{alc.}}$ $(CF_3)_2CFOCH=CH_2$
heptafluoroisopropyl
vinyl ether (d)
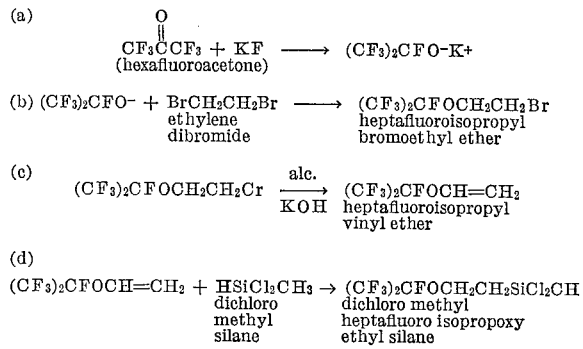

(e)

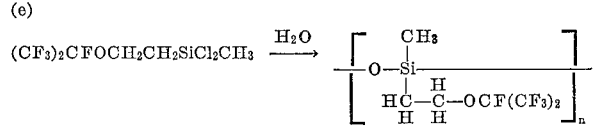

This polymer, shown by Formula III, is a viscous, water insoluble oil and is suitable for use as a lubricant, hydraulic fluid, electrical insulating fluid and in other situations requiring thermal and oxidation stability and may be converted to elastomeric materials.

Perfluoroalkoxide source materials suitable for use in the present invention are the perhaloalcoholates such as, e.g., the alkali metal methylates, ethylates, propylates, cyclobutylates, cyclopentylates, cyclohexylates, octylates (i.e. alkali metal alkoxides), perfluoroketones, perfluorinated organic acid fluorides which form an anion, e.g., perfluoroacetyl fluoride, carbonyl fluoride, perfluoroheptanoyl fluoride and the like. Specific examples of suitable ketone reactants are perfluoroacetone, perfluorocyclobutanone, perfluorocyclopentanone, perfluorocyclohexanone, and the like.

Organic halides found to be particularly suitable for use in the present invention are the dihalogenated alkanes, e.g. ethylene dibromide ($BrCH_2CH_2Br$), chlorobromoethane ($BrCH_2CH_2Cl$), chloroiodoethane ($ClCH_2CH_2I$), hexamethylene dibromide ($BrCH_2(CH_2)_4CH_2Br$), decamethylene dibromide ($BrCH_2(CH_2)_8CH_2Br$), and the like as well as haloalkyl aryl sulfonate esters, e.g., the p-toluene sulfonate ester of a 2-haloethanol

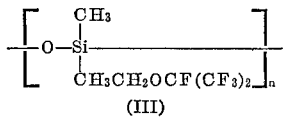

where X′ is chloro-, bromo- or iodo-.

Solvents suitable for use in the preparation of the 1:1 addition product of the perfluoroalkoxide and alkali metal fluoride and for the subseqent reaction of this material with the organic halide to give the perfluoroalkyl haloalkyl ether are those aprotic polar organic liquids which are inert to the reactants and products and which will dissolve these materials. Conveniently, the higher boiling ethers such as β,β-dimethoxydiethyl ether (commonly referred to as diglyme), N,N-dimethyl formamide, acetonitrile, tetramethylene sulfone, N,N-dimethyl acetamide and the like are employed as solvents.

The following examples will serve to further illustrate the present invention but are not meant to limit it thereto.

Example 1

Preparation of

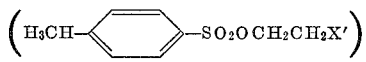
(III)

A three-liter, three-neck flask fitted with a stirrer, gas inlet tube and Dry Ice condenser was charged with 87 grams (1.5 gram moles) potassium fluoride (KF) and 1.5 liters of diglyme solvent. Dry Ice was placed in a condenser and the flask was cooled and maintained at about 10° C. in an ice bath. About 250 grams (1.5 gram mole of hexafluoroacetone, $(CF_3)_2C=O$) was slowly introduced into the flask through the gas inlet. During this process, the bulk of the KF dissolved; an additional quantity, 35 grams, of the hexafluoroacetone was added to assure complete solution of the KF reactant. This gave a reaction mixture containing hexafluoroacetone in about 15 weight percent excess of that required stoichiometrically for the 1:1 addition product of $(CF_3)_2C=O \cdot KF$, (also expressed as $(CF_3)_2CFO^- + K^+$).

After the addition of the hexafluoroacetone was complete, about 376 grams (2 gram moles) of ethylene dibromide ($BrCH_2CH_2Br$) was added to the reaction mixture and this heated at 65° C. for about 24 hours and at 85° C. for an additional 24 hours. At the end of this period, the reaction mixture was poured into five liters of water; the oil layer which separated was recovered and washed three times with separate 3-liter portions of water. The so-washed oil product was dried over anhydrous magnesium sulfate and distilled. About 180 grams of product was recovered. This product was redistilled on an 8 millimeter by 24 inch spinning band distillation column. Two fractions were recovered; the first fraction boiling at 100–106° C. was determined to be primarily 1,2-bis-heptafluoroisopropoxy ethane,

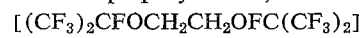

the other fraction, weighing about 96 grams, boiled between 106–108° C. and was found to be 2-bromoethyl heptafluoroisopropyl ether

containing some unreacted $BrCH_2CHBr$.

The $(CF_3)_2CFOCH_2CH_2Br$, without further purification, was dehydrobrominated to $(CF_3)_2CFOCH=CH_2$ by the following procedure. Fifty-six grams (one gram mole) of potassium hydroxide and 300 cubic centimeters of absolute ethanol were put into a 500 milliliter three-neck flask fitted with a stirrer, addition funnel and a gas outlet tube inserted through a reflux condenser. The flask was heated on a steam bath to the reflux temperature of the ethanolic potassium hydroxide solution and 76 grams of the impure $(CF_3)_2FCOCH_2CH_2Br$ was added over a 15 minute period. Low boiling products were collected as they formed in a Dry Ice trap connected to the exit of the water cooled reflux condenser. The heating of the reaction vessel and product collection was continued for 30 minutes following completion of the halo ether addition.

The products collected in the Dry Ice trap were distilled on an 8 millimeter by 24 inch spinning band column at atmospheric pressure (746 mm. Hg). This distillation gave 16 grams of $CH_2=CHBr$, B.P. 14–16° C., and 16 grams of heptafluoroisopropyl vinyl ether corresponding to the formula $(CF_3)_2CFOCH=CH_2$, having a B.P. of 28.5–29.4° C.

The structure of the ether was proved by the following analyses:

Infrared absorption spectrum showed a strong C=C absorption band at 6.10 microns. Other strong bands were observed at 7.60, 8.05, 8.45, 8.72, 9.15, 10.02, 10.70 and 11.42 microns. A weak CH band was indicated at 3.22 microns and broad bands were found at 13.7 and 14.15 microns.

The molecular weight as determined by gas density was found to be 205. Theoretical calculated molecular weight is 212.

The nuclear magnetic resonance data and mass spectra fully substantiated the structure and indicated the presence of a trace amount of a $CH_3$-containing impurity.

About 11.2 grams (0.054 gram mole) of the vinyl ether, 11.5 grams (0.1 gram mole) of methyl dichlorosilane ($CH_3SiCl_2H$) and 1 microliter of 1 percent chloroplatinic acid ($H_2PtCl_6$) solution in isopropanol were sealed in a 50 milliliter glass ampoule and heated at 125° C. for 20 hours. After this time, the ampoule was cooled and the product distilled on an 8 millimeter by 24 inch spinning band column at 30 millimeters mercury pressure. Following removal of unreacted excess $CH_3SiCl_2H$, the remaining product, shown by analysis to be heptafluoroisopropoxyethyl methyl dichlorosilane,

distilled at about 75° C. Substantially quantitative yield was obtained.

The structure was shown by the infrared absorption spectrum and by nuclear magnetic resonance data. Elemental analysis gave C—22.1%; H—2.2%; F—21.7%; Cl—40.8%. Theoretical calculated analysis for the silane of formula shown directly hereinbefore is C—22.0%; H—2.2%; F—21.2%; Cl—40.7%.

This silane was hydrolyzed in water giving a water insoluble, colorless, viscous oil.

The molecular weight of the silicone, as determined by two separate determinations, was found to be 1030 and 1040 indicating a degree of polymerization ($n$) of about 3.8.

Elemental chemical analysis showed C—26.65%, 26.50% (duplicate runs); H—2.79%; F—48.7%.

Theoretical analysis for a silicone having a monomeric unit corresponding to Formula III is C—26.50%; H—2.57%; F—48.9%.

Example 2

About 28 grams of perfluorocyclobutyl fluorosulfate

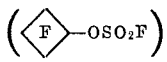

15.2 grams of cesium fluoride (CsF) and 150 cubic centimeters of diglyme solvent were charged to a cold, pressure vessel reactor. The reactor was warmed to room temperature whereupon $SO_2F_2$ evolved and

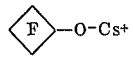

formed. After the $SO_2F_2$ was removed from the system, 23.4 grams of the p-toluene sulfonate ester of 2-chloroethanol

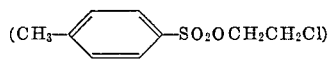

was added and the resulting mixture heated on a steam bath overnight (~18 hours). The resulting product mixture was poured into an excess of water and the oil product layer separated, washed, dried and distilled. Elemental chemical analysis of this product showed it to contain 27.7% carbon and 1.66% hydrogen. Theoretical calculated analysis for perfluorocyclobutyl chloroethyl ether

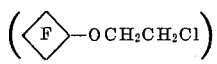

is C—27.7%; H—1.53%. Nuclear magnetic resonance data and the infrared spectrum confirmed the structure.

The ether was dehydrochlorinated following the procedure described in Example 1 to yield the corresponding vinyl ether,

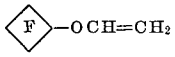

Proof of structure for this compound was shown by a strong C=C infrared absorption band at 6.2 microns and nuclear magnetic resonance data which were consistent for the structure.

Adding methyl dichlorosilane to the vinyl ether to produce methyl perfluorocyclobutoxy ethyl dichlorosilane

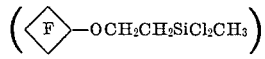

and subsequent hydrolysis of this material by the process steps set forth in Example 1 give a polymeric silicone having monomeric units corresponding to the formula

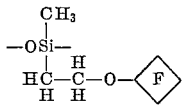

Example 3

Following the general procedure set forth in Example 1, a pressure vessel reactor was charged with 2.9 grams of KF, 150 cubic centimeters diglyme solvent and 8.3 grams of hexafluoroacetone and the resulting mixture stirred until solution was complete. About 11.7 grams of the p-toluene sulfonate ester of 2-chloroethanol

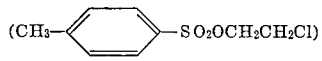

was added to the solution and the mixture heated for 16 hours on a steam bath. The oil product was separated and recovered by treating with water; it was washed and distilled at a reduced pressure.

The infrared spectrum and nuclear magnetic resonance data showed the low boiling product to be heptafluoroisopropoxy chloroethyl ether.

Dehydrochlorination, reaction with methyl dichlorosilane and hydrolysis of the resulting silane following the procedural step set forth in Example 1 yields the polymeric silicone having a monomeric unit corresponding to the formula

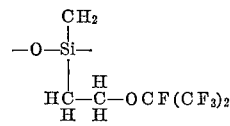

This oil polymer has the same properties and characteristics as that shown for the product obtained in Example 1.

In a manner similar to that described for the foregoing examples, other polymeric silicones within the scope of the invention can be prepared using the reactants and process conditions defined hereinbefore.

Various modifications can be made in the present invention without departing from the spirit or scope thereof for it is understood that we limit ourselves only as defined in the appended claims.

We claim:
1. A flourine containing silicone compound corresponding to the formula:

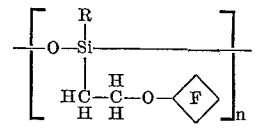

wherein R is a hydrocarbon radical having from 1 to 8 carbon atoms, —⟨F⟩ is perfluorocyclobutyl and $n$ is an integer greater than 1.

2. A process for preparing flourine containing silicone compounds corresponding to the formula:

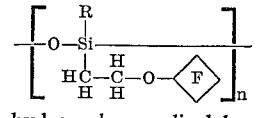

wherein R is a hydrocarbon radical having from 1 to 8 carbon atoms, —⟨F⟩ is perfluorocyclobutyl and $n$ is an integer greater than 1, which comprises:

(a) reacting perfluorocyclobutyl fluorosulfate (⟨F⟩—$OSO_2F$)

with potassium fluoride, cesium fluoride or rubidium fluoride to prepare the corresponding alkoxide, ⟨F⟩—$O^-M^+$ wherein $M^+$ is a potassium, cesium or rubidium ion;

(b) reacting the alkoxide with a haloethyl aryl sulfonate ester corresponding to the formula $\phi$—$SO_2OCH_2CH_2X$ where $\phi$ is aryl and X is Cl, Br or I to form a perfluorocyclobutyl haloethyl ether (⟨F⟩—$OCH_2CH_2X$) where X is as defined above;

(c) dehydrohalogenating the haloethyl ether to form the corresponding vinyl ether, 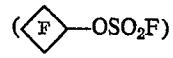

(d) reacting the vinyl ether with a dichlorosilane corresponding to the formula $HSiCl_2R$ where R is a hydrocarbon radical having from 1 to 8 carbon atoms in the presence of a catalyst employed for silane additions at a temperature of from about 50° to 150° C. to prepare an addition product of the vinyl ether and the silane, and (e) hydrolyzing the addition product of the dichlorosilane and vinyl ether to form the desired product.

3. The process of claim 2 wherein the vinyl ether is dehydrohalogenated by contacting the ether with an alkali metal hydroxide in a non-reactive solvent.

4. The process of claim 2 wherein the reactants are contacted in an aprotic polar organic liquid as solvent which is inert to the reactants and products and which is capable of dissolving these materials.

5. The process of claim 2 wherein the haloethyl aryl sulfonate ester is the p-toluene sulfonate ester of 2-chloroethanol.

References Cited

UNITED STATES PATENTS

| 3,331,813 | 7/1967 | Pittman et al. | 260—46.5 |
| 3,420,793 | 1/1969 | Pittman et al. | 260—46.5 |
| 3,422,131 | 1/1969 | Pittman et al. | 260—448.2 |
| 3,132,117 | 5/1964 | Schmidt | 260—46.5 |

TOBIAS E. LEVOW, Primary Examiner

A. P. DEMERS, Assistant Examiner

U.S. Cl. X.R.

252—49.2, 78; 260—46.5